US012014070B2

(12) United States Patent
Lv et al.

(10) Patent No.: US 12,014,070 B2
(45) Date of Patent: Jun. 18, 2024

(54) METHOD, DEVICE, AND COMPUTER PROGRAM PRODUCT FOR STORAGE MANAGEMENT

(71) Applicant: EMC IP Holding Company, LLC, Hopkinton, MA (US)

(72) Inventors: Shuo Lv, Beijing (CN); Huan Chen, Beijing (CN); Lester Ming Zhang, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/488,734

(22) Filed: Sep. 29, 2021

(65) Prior Publication Data
US 2022/0100415 A1 Mar. 31, 2022

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40;
(Continued)

(56) References Cited

U.S. PATENT DOCUMENTS 6,279,050 B1 *  8/2001  Chilton ................. G06F 3/0613
                                                         711/149
7,167,867 B1 *  1/2007  Rago ....................... G06F 16/10
(Continued)

OTHER PUBLICATIONS

Comparison of Memory Types Available for Your Product; John Teel; Aug. 7, 2020; retrieved from https://web.archive.org/web/20200807074518/https://predictabledesigns.com/comparison-of-memory-types-available-for-your-product/ on Jul. 12, 2023 (Year: 2020).*
(Continued)

*Primary Examiner* — Daniel C. Chappell
(74) *Attorney, Agent, or Firm* — Brian J. Colandreo; Heath M. Sargeant; Holland & Knight LLP

(57) ABSTRACT

Embodiments of the present disclosure provide a method, a device, and a computer program product for storage management. The method for storage management includes: acquiring a reading request for a first target file, the reading request including a first target file name of the first target file. The method further includes: determining a first target characteristic value for the first target file based on the first target file name. The method further includes: determining first target index information for the first target file from a mapping from characteristic values to index information based on the first target characteristic value, wherein the first target index information is used to index the first target file from a merged file. The method further includes: reading the first target file included in the merged file from a storage system based on the first target index information. As a result, access to a large number of small files can be converted into access to large files, thereby improving the overall file access efficiency.

16 Claims, 8 Drawing Sheets

(58) Field of Classification Search
CPC ....... G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 7,840,537 B2* | 11/2010 | Gokhale | ................. | G06F 3/061 |
| | | | | 707/698 |
| 8,296,398 B2* | 10/2012 | Lacapra | ............. | H04L 67/1097 |
| | | | | 209/217 |
| 8,447,782 B1* | 5/2013 | Vipul | ................... | G06F 16/252 |
| | | | | 707/790 |
| 8,452,731 B2* | 5/2013 | Preslan | ............... | G06F 11/1464 |
| | | | | 707/693 |
| 8,452,932 B2* | 5/2013 | Pangal | ................ | G06F 11/1453 |
| | | | | 711/E12.103 |
| 8,510,267 B2* | 8/2013 | Barton | .................. | G06F 3/0619 |
| | | | | 707/628 |
| 8,538,926 B2* | 9/2013 | Barton | .................. | G06F 3/0644 |
| | | | | 709/251 |
| 8,554,951 B2* | 10/2013 | Barton | .................. | G06F 3/0671 |
| | | | | 713/400 |
| 8,572,340 B2* | 10/2013 | Vijayan | ................. | G06F 3/0683 |
| | | | | 707/693 |
| 8,732,403 B1* | 5/2014 | Nayak | ................... | G06F 3/0619 |
| | | | | 711/170 |
| 8,904,137 B1* | 12/2014 | Zhang | ..................... | G06F 3/067 |
| | | | | 711/165 |
| 9,015,212 B2* | 4/2015 | David | .................. | G06F 3/0644 |
| | | | | 709/224 |
| 9,020,900 B2* | 4/2015 | Vijayan Retnamma | ..................... G06F 16/22 | |
| | | | | 707/698 |
| 9,690,487 B2* | 6/2017 | Hayasaka | ............. | G06F 3/0619 |
| 9,858,013 B1* | 1/2018 | Srivastav | ............ | G06F 12/0831 |
| 2011/0022780 A1* | 1/2011 | Wakrat | ................ | G06F 12/0246 |
| | | | | 711/170 |
| 2011/0040795 A1* | 2/2011 | Gordon | ................. | G06F 3/0607 |
| | | | | 707/812 |
| 2015/0370821 A1* | 12/2015 | Pudipeddi | ............... | G06F 16/22 |
| | | | | 707/756 |

OTHER PUBLICATIONS

M. Li, L. Chen, J. Zhao, Q. Zhang and Y. Liu, "Signature-File-Based Approach for Query Answering Over Wireless Sensor Networks," in IEEE Transactions on Vehicular Technology, vol. 57, No. 5, pp. 3146-3154, Sep. 2008, doi: 10.1109/TVT.2007.912340. (Year: 2008).*

S. Y. Sung and J. Fu, "Access methods on aggregation of object-oriented database," 1996 IEEE International Conference on Systems, Man and Cybernetics. Information Intelligence and Systems (Cat. No.96CH35929), Beijing, China, 1996, pp. 977-982 vol. 2, doi: 10.1109/ICSMC.1996.571209. (Year: 1996).*

G. Graefe, "Sort-merge-join: an idea whose time has(h) passed?," Proceedings of 1994 IEEE 10th International Conference on Data Engineering, Houston, TX, USA, 1994, pp. 406-417, doi: 10.1109/ICDE.1994.283062. (Year: 1994).*

D. Zhang, C. Liao, W. Yan, R. Tao and W. Zheng, "Data Deduplication Based on Hadoop," 2017 Fifth International Conference on Advanced Cloud and Big Data (CBD), Shanghai, China, 2017, pp. 147-152, doi: 10.1109/CBD.2017.33. (Year: 2017).*

* cited by examiner

METHOD, DEVICE, AND COMPUTER PROGRAM PRODUCT FOR STORAGE MANAGEMENT

RELATED APPLICATION(S)

This application claims the priority of Chinese Patent Application No. 202011052989.2, filed on 29 Sep. 2020, the entire contents of which are herein incorporated by reference in its entirety.

TECHNICAL FIELD

Embodiments of the present disclosure generally relate to storage systems, and more particularly, to a method, an electronic device, and a computer program product for storage management.

BACKGROUND

Files will be stored in storage systems. In order to read a stored file, storage methods of many storage systems require to read a directory entry corresponding to the file and to read an inode of the file in order to determine the storage location of the file in a storage system and read the actual file content based on the storage location. With the development of various applications, a large number of small files will be generated every day. With the current file access mode, accesses to small files may lead to excessive input/output (I/O) accesses, thus resulting in low access performance.

SUMMARY OF THE INVENTION

The embodiments of the present disclosure relate to an improved solution for storage management.

In a first aspect of the present disclosure, a method for storage management is provided. The method includes: acquiring a reading request for a first target file, the reading request including a first target file name of the first target file; determining a first target characteristic value for the first target file based on the first target file name; determining first target index information for the first target file from a mapping from characteristic values to index information based on the first target characteristic value, wherein the first target index information is used to index the first target file from a merged file which includes multiple sections for storing multiple files and is stored in a storage system, the multiple files including the first target file; and reading the first target file included in the merged file from the storage system based on the first target index information.

In a second aspect of the present disclosure, an electronic device is provided. The electronic device includes: at least one processor; and at least one memory storing computer program instructions, the at least one memory and the computer program instructions being configured to cause, together with the at least one processor, the electronic device to perform actions. The actions include: acquiring a reading request for a first target file, the reading request including a first target file name of the first target file; determining a first target characteristic value for the first target file based on the first target file name; determining first target index information for the first target file from a mapping from characteristic values to index information based on the first target characteristic value, wherein the first target index information is used to index the first target file from a merged file which includes multiple sections for storing multiple files and is stored in a storage system, the multiple files including the first target file; and reading the first target file included in the merged file from the storage system based on the first target index information.

In a third aspect of the present disclosure, a computer program product is provided. The computer program product is tangibly stored on a non-volatile computer-readable medium and includes computer-executable instructions. The computer-executable instructions, when executed, cause a device to perform the method of the first aspect.

It should be understood that the content described in the summary part is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become easily understandable by reading the following detailed description with reference to the accompanying drawings. In the accompanying drawings, several embodiments of the present disclosure are shown by way of example instead of limitation, where.

Throughout all the accompanying drawings, the same or similar reference numerals are used to indicate the same or similar components.

DETAILED DESCRIPTION

The principles and spirits of the present disclosure will be described below with reference to some example embodiments shown in the accompanying drawings. It should be understood that these specific embodiments are described only for the purpose of enabling a person skilled in the art to better understand and then implement the present disclosure, instead of limiting the scope of the present disclosure in any way.

The term "include" and its variants as used herein indicate open-ended inclusion, i.e., "including, but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," and the like may refer to different or identical objects. Other explicit and implicit definitions may also be included below.

Figure 1:
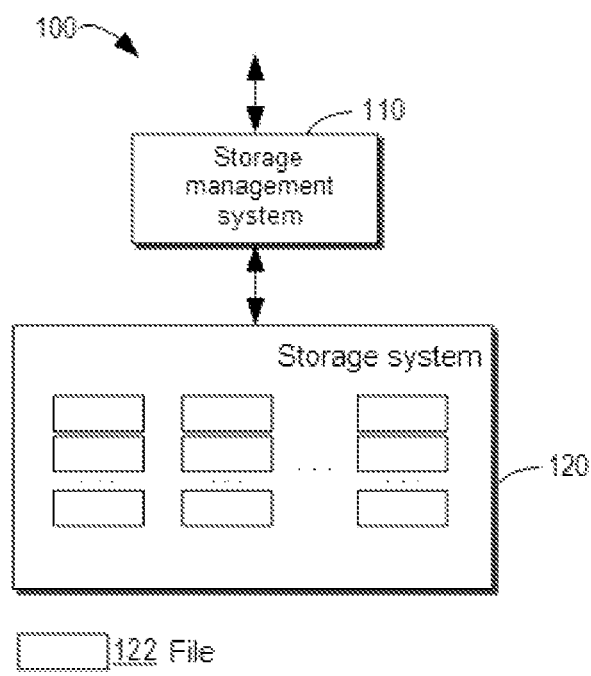
FIG. 1 illustrates a schematic diagram of a conventional storage environment.

FIG. 1 illustrates a schematic diagram of a conventional storage environment. In example environment 100 of FIG. 1, storage management system 110 is configured to control and manage storage system 120, including: storing data to storage system 120, providing access to the data, and other data management operations. Storage management system 110 may perform data access or other data management operations in response to a request from a client terminal or a user. Storage system 120 may include one or more storage devices for providing a data storage space. Various storage devices may be integrated at one site or distributed at different locations.

Multiple files 122 are stored in storage system 120. Storage system 120 may provide access to stored file 122 based on a directory and an inode. Multiple I/O accesses will be required for certain file 122 in storage system 120. For example, when reading certain file 122, at least a directory entry corresponding to file 122 needs to be read into a memory, and the directory entry records a file name of file 122 and an identification of the corresponding inode; the inode of file 122 is then read into the memory, the inode indicating the storage address of file 122 in storage system 120; and then the actual content of file 122 is read from storage system 120. In the process of reading file 122, the reading of information (sometimes referred to as "metadata") used for file indexing, such as the directory entry and the inode, needs to be read multiple times.

Currently, a variety of applications have been developed and become increasingly popular. Examples of such applications include artificial intelligence, the Internet of Things (IoT), smart finance, smart security, sensor networks, various scientific and research and development experiments, and so on. These applications will generate large amounts of data of different types and sizes for storage. These data include a large number of small files, that is, the amount of data in a single file is relatively small. In some application scenarios, the number of small files to be stored reaches tens of millions, billions, or even tens of billions.

For example, in financial applications, it is not only necessary to scan many bills into image files and extract the descriptive information therein to form files, but also to store electronic contracts, signature data, facial recognition data, and so on. Most of such files are small files with sizes ranging from a few bytes to several hundred bytes, and the number of the small files is very large and growing year by year. In addition, these small files may need to be stored for long periods of time, and most of them will need to be read multiple times after a single writing.

The storage and access mechanisms for current storage systems can provide high resilience and availability, high storage efficiency, and high overall performance. However, there are some problems with such mechanisms when accessing (e.g., reading and writing) small files. For example, the directory entry, inode, etc., of a file may be cached in memory during the file reading process described above. This can save the number of I/O accesses to the storage system (e.g., it is necessary to read the file content only once). Moreover, access efficiency is also improved due to the higher speed of access to the memory. However, when storing and accessing a large number of small files, due to the large number of files and limited memory space, it is not possible to cache the directory entries and inodes of all the files into the memory, so for each small file, it is necessary to perform multiple I/O accesses to the storage system to complete the reading of the file. This long-tail effect results in a low overall access efficiency.

Therefore, it is expected to provide a solution to improve the access efficiency of a storage system, especially the access efficiency of a large number of small files.

According to example embodiments of the present disclosure, such an improved solution is provided. According to this solution, multiple files are merged into one large file (referred to as "merged file"). The merged file is stored in a storage system. In this way, access to (for example, reading of and writing in) multiple relatively small files are mapped to access to a large merged file, without the need to perform related operations on the index information of each small file. For each small file, a mapping from characteristic values to index information is established. The characteristic value is determined from a file name, and the index information corresponding to the file is determined from the mapping based on the characteristic value. The index information is used to index this small file from the large file. As a result, access to a large number of small files can be converted into access to the large file. Moreover, because the number of files stored in the storage system is reduced, index information of these files can be loaded into the memory, thereby greatly reducing the number of I/O accesses to the storage system and improving the overall access efficiency.

The embodiments of the present disclosure will be described in more detail below with reference to the accompanying drawings.

Figure 2:
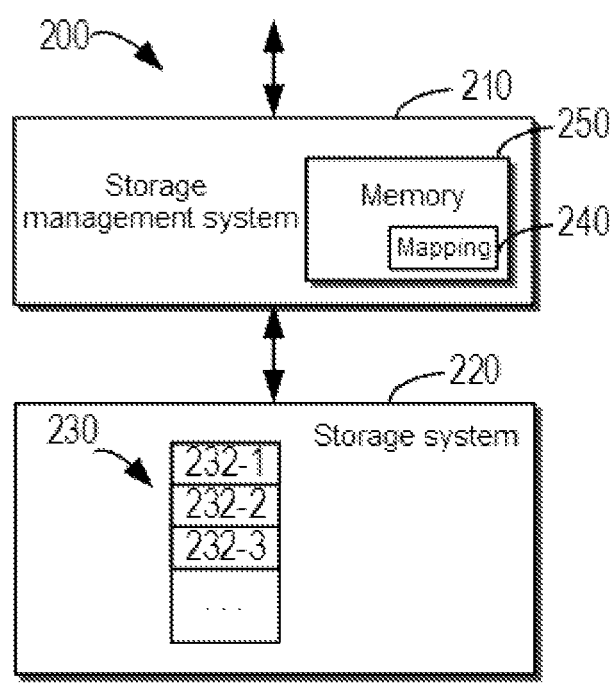
FIG. 2 illustrates a schematic diagram of a storage environment according to some embodiments of the present disclosure.

FIG. 2 illustrates example storage environment 200 according to some embodiments of the present disclosure. As shown in FIG. 2, storage environment 200 includes storage management system 210 and storage system 220.

Storage management system 210 is configured to control and manage storage system 220, including: storing data to storage system 120, providing access to the data, and other data management operations. Storage management system 210 may perform data access or other data management operations in response to a request from a client terminal or a user. Herein, "access" to data or a file may include at least reading, writing, or deleting the data or the file.

Storage management system 210 may be implemented in one or more computing devices, servers, or computing systems. Storage management system 210 may control and manage storage system 220 based on various storage technologies. Storage system 220 may include one or more storage devices (e.g., magnetic disks) for providing a data storage space. Various storage devices may be integrated at one site or distributed in different locations. An example of storage system 220 is a Unix file system (UFS) system, such as a UFS64 system. This is merely an example, and embodiments of the present disclosure may also be applied to storage systems based on other storage technologies.

It should be understood that FIG. 2 only schematically illustrates environment 200, without imposing any limitation to the embodiments of the present disclosure. Various systems/devices in environment 200 may be arranged in any other manner. For example, although shown as separate from storage system 220, storage management system 210 and storage system 220 may also be integrated into a single system.

As briefly mentioned above, according to the embodiments of the present disclosure, multiple files are merged into one file for storage in the storage system. Herein, the file obtained through merging is referred to as a merged file, and the multiple files that are merged are sometimes referred to as small files or sub-files. The merged file includes multiple sections, and each section is used to store a merged file. As discussed in detail later, each section stores at least data of a file and, in some embodiments, also stores other information associated with the file, such as metadata associated with the file.

As schematically shown in FIG. 2, storage system 220 stores merged file 230, wherein merged file 230 includes multiple sections 232-1, 232-2, 232-3, . . . , and so forth. To facilitate discussion, sections 232-1, 232-2, 232-3, etc., in merged file 230 are collectively or individually referred to as section 232. Each section in merged file 230 corresponds to one of the multiple files that are merged. It should be understood that although FIG. 2 illustrates at least 3 files, more or fewer files may be merged in actual merged file 230. In addition, although only one merged file is shown, multiple similar merged files may be stored in storage system 220. The embodiments of the present disclosure are not limited in this respect.

In addition, according to an embodiment of the present disclosure, for merged file 230, mapping 240 from characteristic values to index information is also maintained, which is used to respectively index multiple files from merged file 230 to achieve accesses to individual files. Mapping 240 may include multiple entries which correspond to multiple files in merged file 230, respectively. Each entry includes a characteristic value and index information of a corresponding file.

The index information in mapping 240 is used to index each file from merged file 230. A file name of an individual file in merged file 230 is used to determine a characteristic value in mapping 240. The characteristic value is used to identify a specific file among multiple files that are used for merging. Various techniques can be used to calculate the characteristic value from the file name. The file name can usually be expressed as a character string. One method for calculating the characteristic value is the hash algorithm. For example, a hash function can be applied to the file name, and the obtained hash value can be determined as the characteristic value. There are various hash functions that can be applied to the calculation of the hash value. Herein, the characteristic value is sometimes referred to as a digital digest, and is also referred to as a hash value when a hash function is applied. In addition to the hash value, other algorithms can also be used to calculate a characteristic value specific to a file name based on the file name, as long as the calculated characteristic value can be used to identify the file name (and thus the file).

Figure 3:
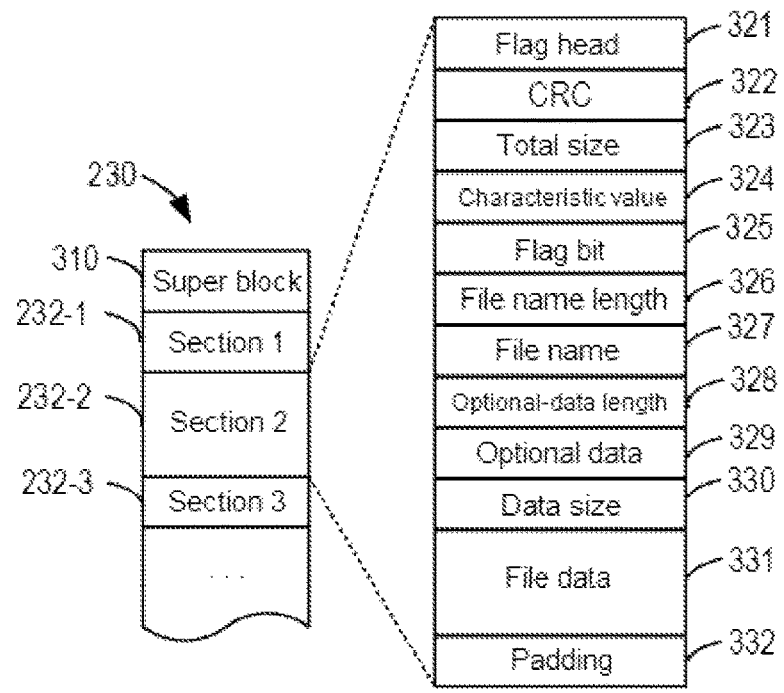
FIG. 3 illustrates an example of a merged file according to some embodiments of the present disclosure.
Figure 4:
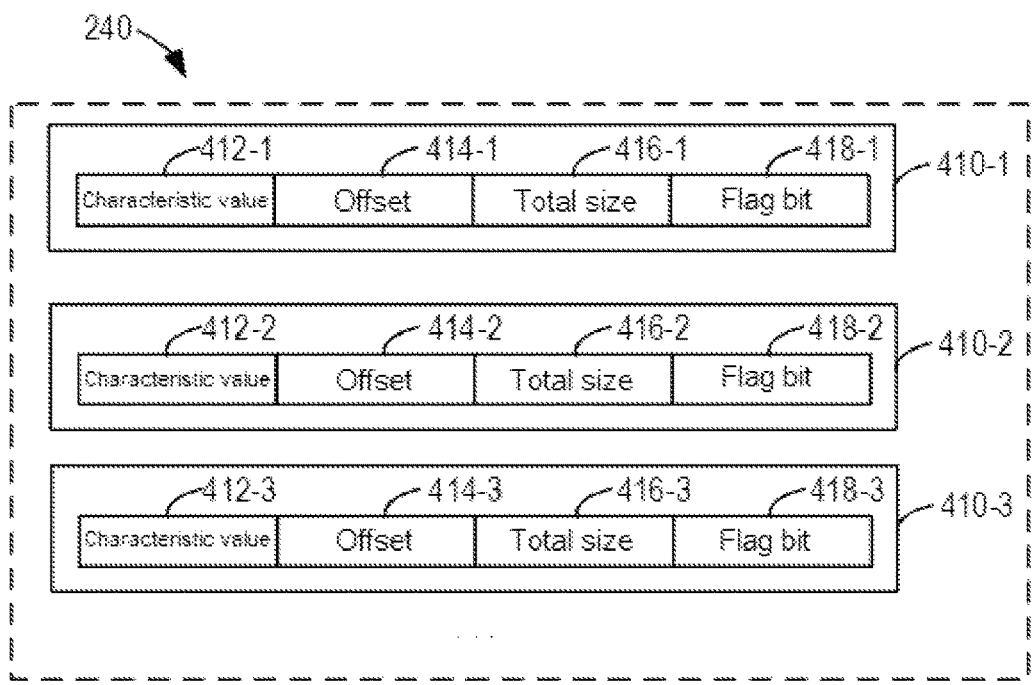
FIG. 4 illustrates an example of a mapping from characteristic values to index information according to some embodiments of the present disclosure.

FIGS. 3 and 4 respectively provide examples of merged file 230 and mapping 240 from characteristic values to index information. As shown in FIG. 3, merged file 230 includes multiple sections 232-1, 232-1, 232-3, etc., which are respectively used to store files merged therein. In some embodiments, merged file 230 further includes super block 310 in which metadata associated with merged file 230 is stored. In an example, super block 310 may be located at the head of merged file 230.

FIG. 3 also shows a specific example of the information included in section 232. In addition to field 331 storing file data of an individual file, as shown in FIG. 3, section 232 may also be used to store other fields of metadata associated with the file. In some embodiments, section 232 may further include data size field 330, which is used to indicate the size of field 331; special flag head field 321, which is used to identify section 232, such as a magic number; cyclic redundancy check (CRC) field 322, which is used to store check information for checking the integrity of file data 331; total size field 323, which is used to indicate the total size of section 232; and characteristic value field 324 which is used to store the characteristic value of the file name of the file corresponding to section 232.

Alternatively or additionally, section 232 may further include flag bit field 325 that is used to mark the deleting state of section 232, which will be discussed below in detail in some embodiments. Alternatively or additionally, section 232 may further include file name length field 326, which is used to indicate the length of the file name of the file corresponding to section 232; and file name field 327 which is used to store the file name of the corresponding file. Alternatively or additionally, section 232 may further include optional-data length field 328, which is used to indicate the length of optional data; optional data field 329, which is used to store optional data for the corresponding file, wherein such data include, for example, information associated with the file, such as the creation time, the author, the access permission, and the globally unique identifier (GUID) of the file. Alternatively or additionally, section 232 may further include padding field 332, which is used to include padding data if necessary, so as to align the total size of section 232 to a specific unit (for example, a unit of 512 bytes) required by storage system 220, and so on.

Note that since the file name length of each file to be merged is different, the optional data to be stored is different, and the size of the file data is also different, the total size of section 232, in merged file 230, which is allocated to each file may also be different.

It should be understood that FIG. 3 illustrates only a specific example of section 232 of merged file 230. In other embodiments, one or more of the fields shown in FIG. 3 may be deleted from section 232, or other fields may be added to section 232 for storing information associated with the files to be merged. For example, in some cases, section 232 may even only include field 331 for storing file data. In addition, the fields in section 232 may be arranged in another order.

In the example of FIG. 4, mapping 240 from characteristic values to index information includes multiple entries 410-1, 410-2, 410-3, . . . , etc. To facilitate discussion, multiple entries 410-1, 410-2, 410-3, etc., are collectively or individually referred to as entry 410. Multiple entries 410 respectively correspond to multiple files that are merged in merged file 230, and thus also respectively correspond to multiple sections 232 in merged file 230. For example, entry 410-1 corresponds to section 232-1, entry 410-2 corresponds to section 232-2, entry 410-3 corresponds to section 232-3, and so on.

Each entry 410 includes at least the characteristic value and index information for the corresponding file. As mentioned above, the characteristic value is determined based on the file name and is used to identify the corresponding file among the multiple files that are merged, and the index information is used to index the corresponding file from merged file 230. In some embodiments, the index information includes an offset and a total size of section 232, which is used to store a corresponding individual file, in merged file 230. Based on the offset and the total size, specific section 232 can be located from merged file 230. In some embodiments, each entry may also include a flag bit field that is used to mark the deleting state of corresponding section 232, which will be discussed in detail in some embodiments below.

In some embodiments, in the process of storage management, a specific directory, which is, for example, referred to as a directory of a large number of small files, may be created for merged file 230 under the root directory. This directory is dedicated to storing small files. Each such directory points to one merged file 230. In the initial stage, the creation of the directory will trigger the creation in storage system 230 of merged file 230 which initially has no section for files. As files are continuously merged into merged file 230, the size of this merged file may continue to increase. This will be discussed in more detail in the process of file writing below.

FIG. 4 shows that each of entries 410-1, 410-2, and 410-3 includes fields for storing the characteristic value, the index information, and the flag bit. As shown in the figure, entry 410-1 includes characteristic value field 412-1, which is used to indicate the characteristic value of the file name of the corresponding file; offset field 414-1 and total size field 416-1, which are used to respectively store the offset and the total size of corresponding section 232 in merged file 230, in order to be used together as index information. In addition, entry 410-1 further includes flag bit field 418-1, which is used to mark the deleting state of corresponding section 232. Similarly, entry 410-2 includes characteristic value field 412-2, offset field 414-2, total size field 416-2, and flag bit field 418-2; entry 410-3 includes characteristic value field 412-3, offset field 414-3, total size field 416-3, and flag bit field 418-3, and so on.

Hereinafter, to facilitate discussion, characteristic value fields 412-1, 412-2, and 412-3 are sometimes collectively or individually referred to as characteristic value field 412, offset fields 414-1, 414-2, and 414-3 are sometimes collectively or individually referred to as offset field 414, total size fields 416-1, 416-2, and 416-3 are sometimes collectively or individually referred to as total size field 416, and flag bit fields 418-1, 418-2, and 418-3 are sometimes collectively or individually referred to as flag bit field 418.

Merged file 230 and mapping 240 are used together to implement access to each small file in merged file 230. Mapping 240 may be updated with merged file 230 to maintain synchronization with merged file 230. In a scenario of file reading, if a client terminal wants to read a certain file in merged file 230, storage management system 210 may determine the characteristic value based on the file name of the file, and search, from mapping 240, index information mapped to the determined characteristic value, for example, offset 414 and total size 416 of corresponding section 232. Based on the index information, storage management system 210 reads corresponding section 232 from storage system 220, and returns the file data stored therein to the client terminal.

In some embodiments, in order to further improve the access to each file in merged file 230, mapping 240 may be stored in a storage device that has a faster speed of access than a magnetic disk in storage system 220. In this way, the speed of access to mapping 240 will be higher. In an embodiment, as shown in FIG. 2, mapping 240 is cached in memory 250. Such mapping 240 may be referred to as in-memory mapping 240. In the mapping from characteristic values to index information, the amount of information that needs to be maintained for each small file in merged file 230 is relatively small. Therefore, even if the number of small files increases (regardless of whether in a single merged file or multiple merged files), the storage space required to store the mapping is acceptable. For example, for each small file in merged file 230, the size of entry 410 of mapping 240 may be a dozen of bytes. For billions of small files, the total size of the mapping is around a dozen of gigabytes, which is acceptable in a cache of a memory. Therefore, it is feasible in practical applications to use a storage device (for example, a memory) with a higher speed of access to store the mapping.

If mapping 240 is stored in a memory, mapping 240 may be erased in the event of a system power failure or restart. In this case, mapping 240 may be reconstructed for storage into memory 250. In some embodiments, mapping 240 may be regenerated by reading merged file 230 from storage system 220. In some cases, since the total size of merged file 230 is large, the overhead of reading merged file 230 and generating mapping 240, including time consumption, etc., will be large.

In some embodiments, in order to speed up the reconstruction of mapping 240, an index file may also be stored in storage system 220 in order to store therein information required for regenerating mapping 240. Such information may come from merged file 230 or be calculated based on the information contained therein, but does not need to include all the information in merged file 230, for example, at least does not need to include the file data of the merged file. The persistent storage of the index file can ensure that the indexes of the small files in merged file 230 will not be lost. Therefore, the index file can be considered as a checkpoint of mapping 240 to help restore mapping 240 at any time. Since the index file is smaller than merged file 230, it will be faster and more efficient to read the index file from storage system 220 to regenerate mapping 240, thereby reducing the initialization time of mapping 240.

Figure 5:
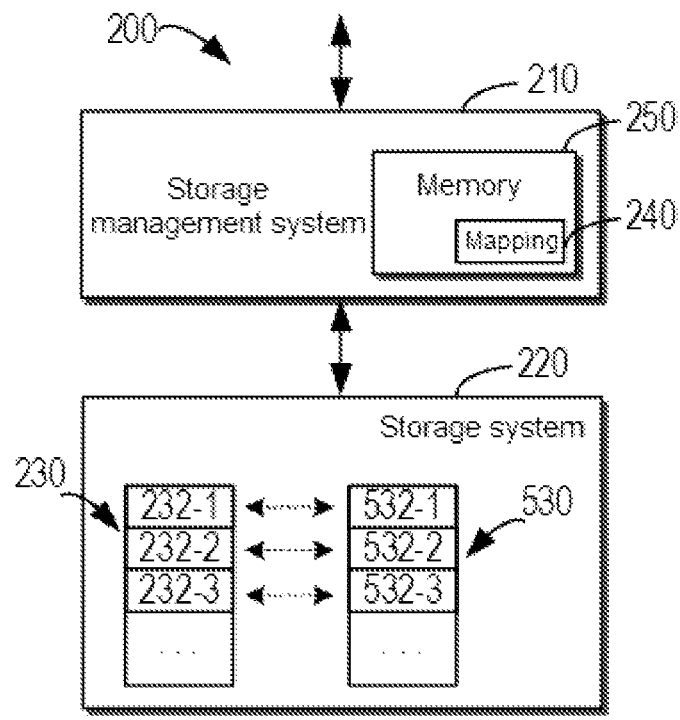
FIG. 5 illustrates a block diagram of a storage environment according to some other embodiments of the present disclosure.

FIG. 5 illustrates example storage environment 200 in such an embodiment, wherein index file 530 is stored in storage system 220. Index file 530 includes multiple entries 532-1, 532-2, 532-3, ... and so on. To facilitate discussion, multiple entries 532-1, 532-2, 532-3, etc. are collectively or individually referred to as entry 532. Multiple entries 532 respectively correspond to multiple files that are merged in merged file 230, and thus also respectively correspond to multiple sections 232 in merged file 230. For example, entry 532-1 corresponds to section 232-1, entry 532-2 corresponds to section 232-2, entry 532-3 corresponds to section 232-3, and so on.

Figure 6:
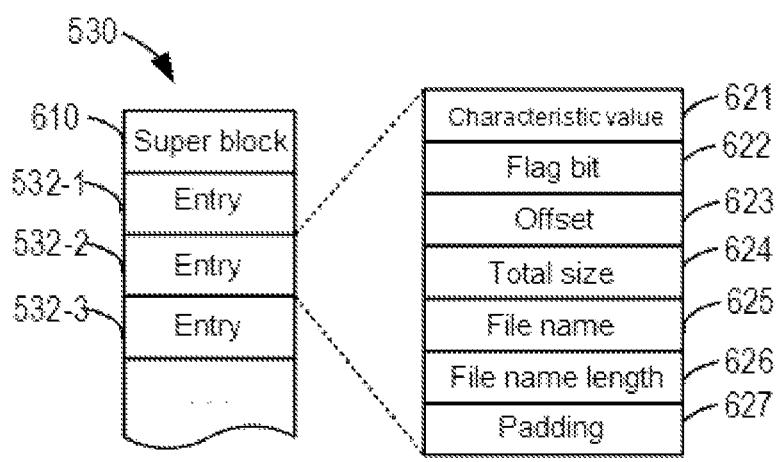
FIG. 6 illustrates an example of an index file according to some embodiments of the present disclosure.

FIG. 6 illustrates a specific example of the information included in index file 520. As shown in FIG. 6, index file 520 includes super block 610 in which metadata associated with index file 520 is stored. In an example, super block 610 may be located at the head of index file 520.

FIG. 6 also specifically illustrates an example of the information included in entry 532. As shown in FIG. 6, entry 532 may include characteristic value field 621, which is used to store the characteristic value of the file name of the file corresponding to section 232. The characteristic value stored in characteristic value field 621 may be the same as that in characteristic value field 324 of the corresponding section 323 in merged file 230. Entry 532 may also include flag bit field 622, which is used to mark the deleting state of section 232. The flag in flag bit field 622 may be the same as that in flag bit field 325 of the corresponding section 323 in merged file 230. Entry 532 may also include offset field 623 and total size field 624, which are respectively used to store the offset and the total size of corresponding section 232 in merged file 230, in order to be used together as index information. The offset and the total size may be determined based on the position and the total size of corresponding section 232 in merged file 230.

Alternatively or additionally, entry 532 may also include size field 624 for indicating the size of entry 532. Alternatively or additionally, entry 532 may also include file name field 625, which is used to store the file name of the file stored in corresponding section 232; and file name length field 626, which is used to indicate the length of the file name stored in file name field 625. The information stored in file name field 625 and file name length field 626 may be the same as that in file name field 327 and file name length field 326 in merged file 230.

Alternatively or additionally, entry 532 may further include padding field 627, which is used to include padding data if necessary, so as to align the total size of entry 532 to a specific unit (for example, a unit of 512 bytes) required by storage system 220, and so on.

It should be understood that FIG. 6 illustrates only a specific example of entry 532 of index file 530. In other embodiments, one or more of the fields shown in FIG. 6 may be deleted from entry 532, or other fields may be added to entry 532 to store information required to generate mapping 240. For example, in some cases, entry 532 may only include characteristic value field 621, offset field 623, and total size field 623, while other fields may be omitted. In some cases, entry 532 may additionally include flag bit field 622. In some embodiments, the storing itself of the file name in entry 532 may help check the characteristic value in characteristic value field 621. In addition, the fields in entry 532 may be arranged in other orders.

As mentioned above, index file 530 can be used to reconstruct mapping 240. In some embodiments, the reconstruction of mapping 240 may be performed by storage management system 210. If storage management system 210 determines that mapping 240 is removed from memory 250, storage management system 210 reads index file 530 from storage system 210. The access mode of index file 520 may be similar to the access mode provided by storage system 210 for general files. After reading index file 530, storage management system 210 may regenerate mapping 240 based on the characteristic values and index information included in multiple entries 532 in index file 530. Storage management system 210 may cache the regenerated mapping 240 in memory 250 for subsequent access to the files in merged file 230.

In some embodiments, the process of file access proposed by the embodiments of the present disclosure also facilitates directory traversal. According to the conventional methods, it is necessary to traverse all directories in one directory. However, according to an embodiment of the present disclosure, directory traversal can be provided by reading index file 530, because index file 530 stores the file names of the files in merged file 230.

In the operation, if the sub-files in merged file 230 are to be added or deleted, index file 530 can also be added and deleted accordingly to reflect the updated merged file 230. In some embodiments, index file 530 may be updated asynchronously with merged file 230. For example, if a new file is merged into merged file 230, a new section 232 will be added to merged file 230. Entry 532 in index file 530 may be added asynchronously. For another example, if one file in merged file 230 is deleted, the flag bit in flag bit field 325 in corresponding section 232 can be set as deleted to indicate the deleting state. However, deleting flag bit field 622 in index file 530 may be set asynchronously. Such an asynchronous update can ensure that the writing and deleting operations on each file are completed quickly, because there is no need to perform additional synchronous magnetic-disk writing operations during the execution of the writing and deleting operations on the file.

However, the asynchronous update will make index file 530 not always reflect the latest merged file 230 in time. If index file 530 that is not synchronized with merged file 230 is used to reconstruct mapping 240, incorrect mapping information will be obtained, thereby affecting subsequent file accesses.

In some embodiments, before using index file 530 to reconstruct mapping 240, storage management system 210 may update index file 530 to synchronize index file 530 to merged file 230. In some embodiments, the order of the multiple entries 532 in index file 530 may remain the same as that of the multiple files in merged file 230. In some embodiments, during the creation and modification of merged file 230, a new section 232 for storing the file to be merged is attached after the existing section 232 in merged file 230. If index file 530 is synchronized to merged file 230 in an asynchronous manner, entry 532 corresponding to the new section 232 can also be attached after the existing entry 532.

Therefore, when updating index file 530, storage management system 210 may determine, by comparing merged file 230 with index file 530, whether merged file 230 also includes a file added after the current version of index file 530. For example, by sequentially comparing the existing sections 232 in merged file 230 with the existing entries 532 in index file 530, storage management system 210 determines that for one or more of sections 232 in merged file 230, there is no corresponding entry 532 in index file 530. In this case, storage management system 210 determines that a section after the last section 232 with a corresponding entry 532 is a newly added section. Section 232 without a corresponding entry 532 may be referred to as an "orphan" section 232. Storage management system 210 can quickly identify such "orphan" sections, because the last entry 532 in index file 530 always corresponds to the last "non-orphan" section in merged file 230.

After determining one or more "orphan" sections 232, storage management system 210 may determine, from storage system 210, the characteristic value of one or more files corresponding to the one or more "orphan" sections and index information used to index these one or more files respectively from merged file 230. For example, storage management system 210 may read "orphan" section 232 from storage system 220, and determine the characteristic value and index information based on "orphan" section 232 that has been read. For example, characteristic value field 324 of each of these sections 232 indicates the characteristic value of the corresponding file, and the index information is determined by analyzing the total size and relative position of the "orphan" section 232. Storage management system 210 may create a new entry 532 in index file 530 for storing the determined characteristic value and index information. Storage management system 210 may use the updated index file 530 to generate mapping 240.

In some embodiments, the deletion of section 232 from merged file 230 may first set the flag bit in flag bit field 325 of section 232 as deleted, but section 232 is still saved in merged file 230. Therefore, when updating index file 530, storage management system 210 may read, from storage system 210, section 232, which is marked as deleted, in merged file 230. In this case, storage management system 210 may determine whether the flag bit in flag bit field 325 in section 232 that has been read is set as deleted. If the flag bit in flag bit field 325 in a certain section 232 is set as deleted, which means that the corresponding file has been deleted, then storage management system 210 can update mapping 240 accordingly, and no longer include entry 410 corresponding to the deleted file (or section 232) in mapping 240.

The embodiments of the file and index information according to some embodiments of the present disclosure are discussed above. Hereinafter, example processes of performing, in the storage environment of the present disclosure, access to small files in a merged file and storage space reclamation will be described with reference to flowcharts.

Figure 7:
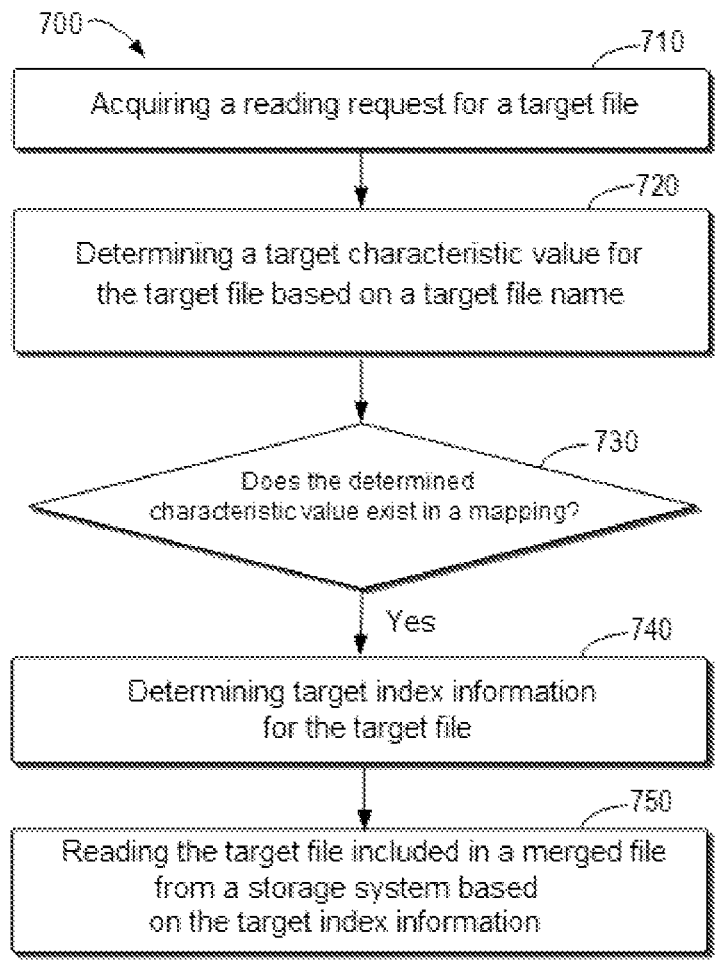
FIG. 7 illustrates a flowchart of a process of file reading according to some embodiments of the present disclosure.

FIG. 7 illustrates a flowchart of process 700 for file reading according to some embodiments of the present disclosure. Process 700 may be implemented at storage management system 210 of FIG. 2. To facilitate discussion, process 700 is described from the perspective of storage management system 210.

In block 710, storage management system 210 acquires a reading request for a target file (sometimes referred to as a "first target file"), the reading request including a target file name of the target file. For example, the reading request may indicate a path of the directory of the target file, e.g., filename:/tmp/dir/abcdefgh, where "abcdefgh" is the file name. In block 720, storage management system 210 determines a target characteristic value for the target file based on the target file name of the target file. For example, the target characteristic value is calculated based on the file name "abcdefgh."

In block 730, storage management system 210 determines whether the determined characteristic value exists in mapping 240. Storage management system 210 may access mapping 240, for example, access mapping 240 from memory 250. If the determined characteristic value exists in mapping 240, in block 740, storage management system 210 determines target index information for the target file to be read, that is, the index information, in mapping 240, which is mapped to the determined characteristic value. The target index information may include, for example, the offset and the total size of section 232, which is used to store the target file, in merged file 230.

In block 750, storage management system 210 reads the target file included in merged file 230 from storage system 220 based on the target index information. For example, storage management system 210 may read corresponding section 232 from merged file 230 based on the target index information and extract file data therein. In some embodiments, storage management system 210 may also determine the integrity of the file data based on the check information, such as CRC, in section 232.

In some embodiments, if it is determined in block 730 that the target characteristic value does not exist in mapping 240, storage management system 210 may use an indication of "the target file does not exist" as an indication to the reading request. In some embodiments, if the determined characteristic value exists in mapping 240, storage management system 210 may also check flag bit field 418 in entry 410 of mapping 240. If the flag bit in flag bit field 418 is set as deleted, storage management system 210 may not perform the reading operation on section 232, but instead, use an indication of "the target file has been deleted" as an indication to the reading request.

Figure 8:
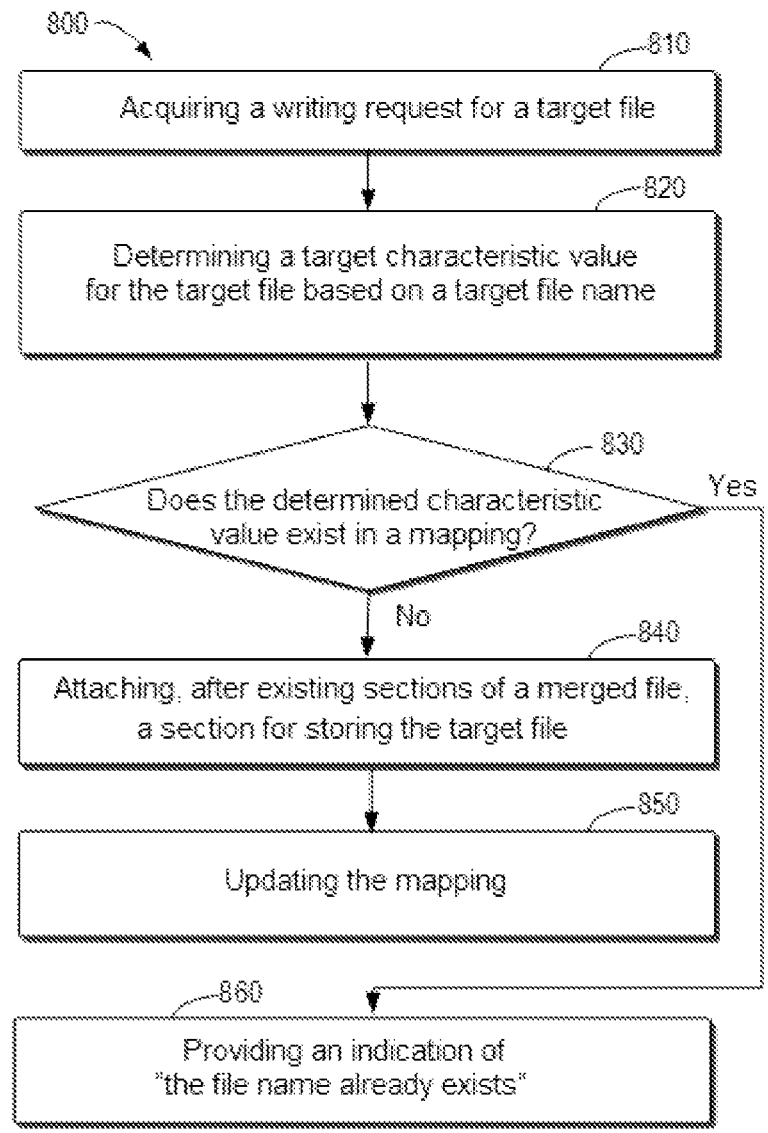
FIG. 8 illustrates a flowchart of a process of file writing according to some embodiments of the present disclosure.

FIG. 8 illustrates a flowchart of process 800 for file writing according to some embodiments of the present disclosure. Process 800 may be implemented at storage management system 210 of FIG. 2. To facilitate discussion, process 800 is described from the perspective of storage management system 210.

In block 810, storage management system 210 acquires a writing request for a target file (sometimes referred to herein as a "second target file"). The writing request may include file data and file name of the target file. In block 820, storage management system 210 determines a target characteristic value for the target file based on the target file name of the target file.

In block 830, storage management system 210 determines whether the determined characteristic value exists in mapping 240. Storage management system 210 may access mapping 240, for example, access mapping 240 from memory 250. If the determined characteristic value does not exist in mapping 240, which means that the file name is new, then in block 840, storage management system 210 attaches section 232, which is used to store the target file currently to be written, after one or more existing sections 232 of merged file 230. Storage management system 210 can allocate storage space in storage system 210 to the new section 232. Section 232 stores file data of the written target file, and in some embodiments, also includes other associated metadata, as described above with reference to the example of FIG. 3.

In block 850, storage management system 210 updates mapping 240. Specifically, storage management system 210 adds a new entry 410 in mapping 240 to store a characteristic value for the written target file, and index information that is in merged file 230. In some embodiments, index file 530 may be updated asynchronously to attach a new entry 532 after the existing entry 532 to store information for the written target file. Reference can be made to the example in FIG. 4 for the format of the new entry 532. In some cases, a synchronous update of index file 530 may also be performed, and the embodiments of the present disclosure are not limited in this respect.

In some embodiments, if it is determined in block 830 that the determined characteristic value exists in mapping 240, which means that the target file to be written has the same name as a file already existing in merged file 230, then storage management system 210 may provide an indication of "the file name already exists" as a response to the writing request.

During file writing, in some embodiments, storage management system 210 may also constrain, by setting a threshold, the writing of small files into merged file 230. For example, storage management system 210 may determine whether the size of the target file to be written is lower than a threshold size. The threshold size can be set as required, for example, it can be 1 MB, 2 MB, and so on. If the size of the target file to be written is lower than the threshold size, storage management system 210 may execute process 800 for file writing. Otherwise, storage management system 210 may store the target file in a conventional file writing manner. In this way, the file access process proposed in the embodiments of the present disclosure can be compatible with the existing file access process. The file access process proposed in the embodiments of the present disclosure can be used to perform access to relatively small files.

Figure 9:
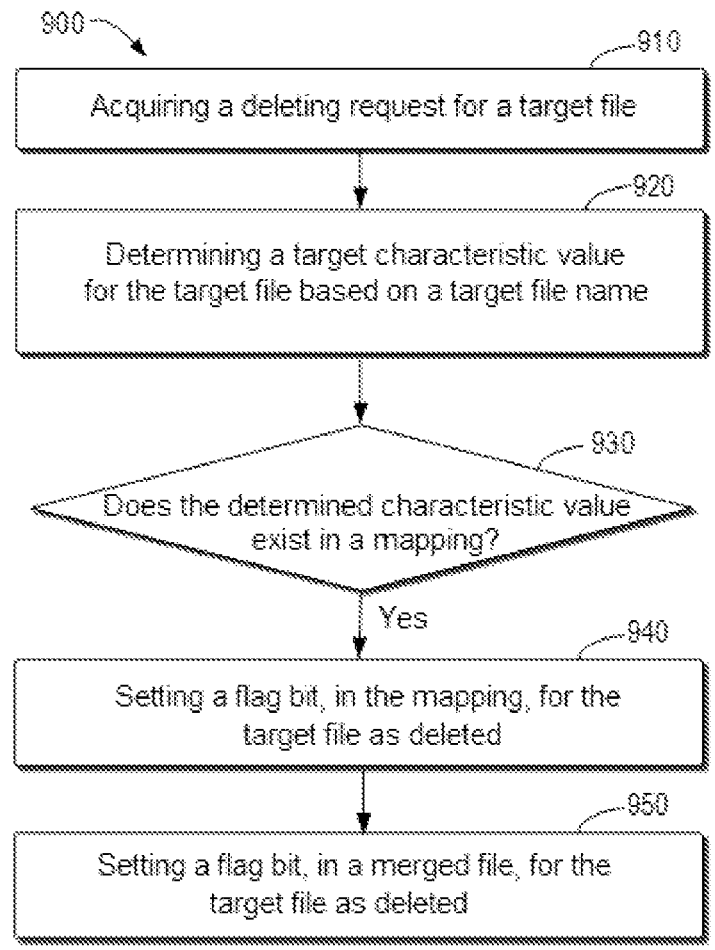
FIG. 9 illustrates a flowchart of a process of file deleting according to some embodiments of the present disclosure.

FIG. 9 illustrates a flowchart of process 900 for file deleting according to some embodiments of the present disclosure. Process 900 may be implemented at storage management system 210 of FIG. 2. To facilitate discussion, process 900 is described from the perspective of storage management system 210.

In block 910, storage management system 210 acquires a deleting request for a target file (sometimes referred to herein as a "third target file"), the reading request including a target file name of the target file. In block 920, storage management system 210 determines a target characteristic value for the target file based on the target file name of the target file.

In block 930, storage management system 210 determines whether the determined characteristic value exists in mapping 240. Storage management system 210 may access mapping 240, for example, access mapping 240 from memory 250. If the determined characteristic value exists in mapping 240, in block 940, storage management system 210 sets a flag bit, in mapping 240, for the target file as deleted. For example, storage management system 210 finds the corresponding entry 410 in mapping 240 based on the determined characteristic value, and sets the flag bit in flag bit field 418 in entry 410 as deleted.

If the determined characteristic value exists in mapping 240, in block 950, storage management system 210 may also set a flag bit, in merged file 230, for the target file as deleted. For example, storage management system 210 finds corresponding section 232 in merged file 230 based on the determined characteristic value, and sets the flag bit in flag bit field 325 in section 232 as deleted. Note that the order of execution of blocks 940 and 950 can be interchanged or can be executed in parallel.

In some embodiments, index file 530 may be updated asynchronously, so as to set the flag bit in flag bit field 622 in the corresponding entry 532 as deleted. In some cases, a synchronous update of index file 530 may also be performed, and the embodiments of the present disclosure are not limited in this respect.

In the example embodiment of FIG. 9, the deletion of the file causes the flag bit in section 232 of merged file 230 to be set as deleted, but in fact section 232 may still occupy the storage space of storage system 220. In some embodiments, storage management system 210 may also perform storage space reclamation. The process of storage space reclamation can be executed periodically or triggered by other events (for example, based on client terminal/user requests).

Figure 10:
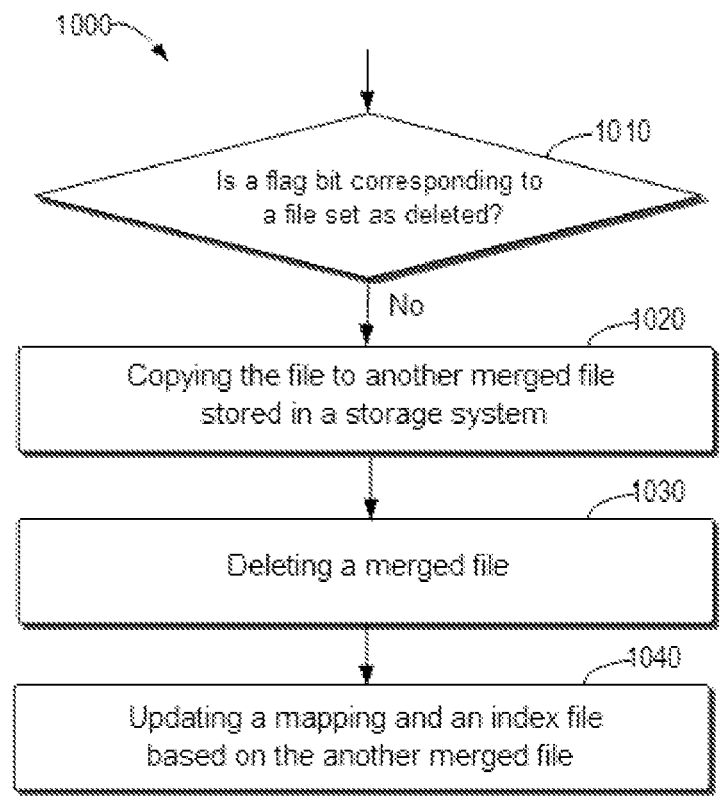
FIG. 10 illustrates a flowchart of a process of storage space reclamation according to some embodiments of the present disclosure.

FIG. 10 illustrates a flowchart of process 1000 for storage space reclamation according to some embodiments of the present disclosure. Process 1000 may be implemented at storage management system 210 of FIG. 2. To facilitate discussion, process 1000 is described from the perspective of storage management system 210.

During storage space reclamation, storage management system 210 may designate another merged file in storage system 220 in order for migrating sections 232 corresponding to undeleted files in merged file 230 to the another merged file.

Specifically, in block 1010, storage management system 210 determines whether multiple flag bits respectively corresponding to one or more files in merged file 230 are set as deleted. Storage management system 210 can determine, by checking flag bit field 325 of each section 232 in merged file 230, whether the one or more files have been deleted. If at least one flag bit respectively corresponding to at least one file in merged file 230 is not set as deleted, in block 1020, storage management system 210 copies the at least one file that has not been deleted to the another merged file in storage system 220. The another file can be newly created or another existing merged file.

In block 1030, storage management system 210 deletes merged file 230 from storage space 220, so as to reclaim the storage space of merged file 230. Storage management system 210 may block a writing request for merged file 230 after the copy of section 232 to the another merged file is completed, and then delete merged file 230 from storage system 220 to realize the reclamation of storage space.

In block 1040, storage management system 210 updates mapping 240 and index file 530 based on the another merged file. If the another merged file is a previously created combined file, storage system 210 may use mapping 240 to update a mapping corresponding to the another combined file. In this example, storage system 210 may modify an index file corresponding to the another merged file, and may delete index file 530. If the another merged file is a merged file newly created for storage space reclamation, storage system 210 may update mappings 240 and 530 accordingly to reflect the undeleted files in the another merged file.

In some embodiments, if during the process of copy from merged file 230 to the another merged file, deletion for one or more files in merged file 230 is performed, in which case, in order to ensure the synchronization of the file states, storage management system 210 may also set the flag bit in flag bit field 325 of corresponding section 232 as deleted while copying corresponding section 232 to the another merged file.

It should be understood that although the operations in the processes are illustrated and described in a specific order, some or all of these operations may be performed in other orders or in parallel. In some embodiments, certain operations may be omitted, or other operations may be added.

Figure 11:
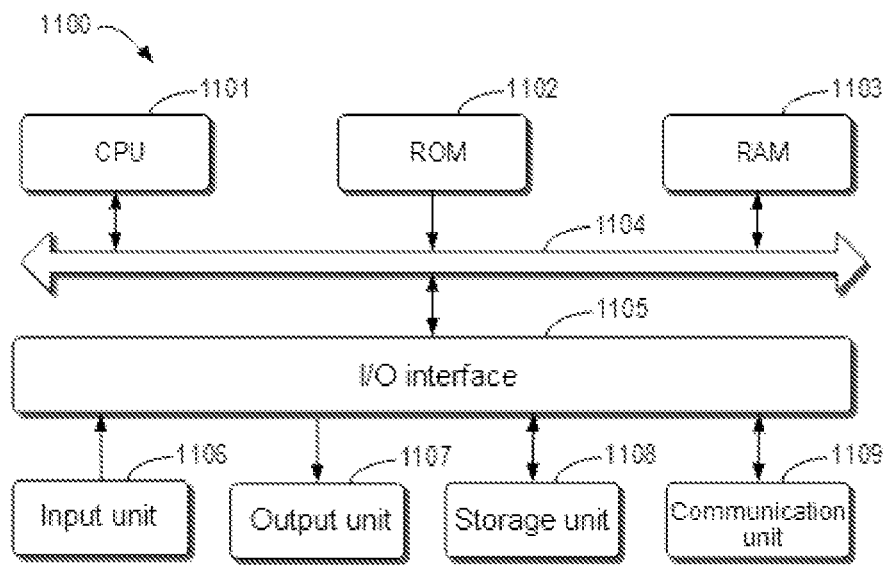
FIG. 11 illustrates a schematic block diagram of a device that may be used to implement the embodiments of the present disclosure.

FIG. 11 schematically illustrates a block diagram of device 1100 that can be used to implement the embodiments of the present disclosure. It should be understood that device 1100 shown in FIG. 11 is merely an example and should not constitute any limitation to the functions and scope of the embodiments described herein. Device 1100 shown in FIG. 11 may be used to implement processes 700 to 1000 of FIGS. 7 to 10. Device 1100 shown in FIG. 11 may be implemented as or included in storage management system 210 of FIG. 2.

As shown in FIG. 11, device 1100 includes central processing unit (CPU) 1101 that may perform various appropriate actions and processing according to computer program instructions stored in read-only memory device (ROM) 1102 or computer program instructions loaded from storage unit 1108 to random access memory device (RAM) 1103. In RAM 1103, various programs and data required for the operation of device 1100 may also be stored. CPU 1101, ROM 1102, and RAM 1103 are connected to each other through bus 1104. Input/output (I/O) interface 1105 is also connected to bus 1104.

Multiple components in device 1100 are connected to I/O interface 1105, including: input unit 1106, such as a keyboard and a mouse; output unit 1107, such as various types of displays and speakers; storage unit 1108, such as a magnetic disk and an optical disk; and communication unit 1109, such as a network card, a modem, and a wireless communication transceiver. Communication unit 1109 allows device 1100 to exchange information/data with other devices through a computer network such as the Internet and/or various telecommunication networks.

The various processes and processing described above, such as processes 700 to 1000, may be performed by processing unit 1101. For example, in some embodiments, processes 700 to 1000 may be implemented as a computer software program that is tangibly included in a machine-readable medium, for example, storage unit 1108. In some embodiments, part or all of the computer program may be loaded and/or mounted to device 1100 via ROM 1102 and/or communication unit 1109. When the computer program is loaded onto RAM 1103 and executed by CPU 1101, one or more steps of processes 700 to 1000 described above may be performed.

The embodiments of the present disclosure may further provide a computer-readable storage medium having computer-executable instructions stored thereon, wherein the computer-executable instructions are executed by a processor to implement the method described above. According to an example implementation of the present disclosure, a computer program product is further provided. The computer program product is tangibly stored on a non-transitory computer-readable medium and includes computer-executable instructions, wherein the computer-executable instructions are executed by a processor to implement the method described above.

Various aspects of the present disclosure are described herein with reference to flowcharts and/or block diagrams of the method, the apparatus, the device, the computer-readable medium, and the computer program product according to implementations of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods, and computer program products according to multiple implementations of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

Various implementations of the present disclosure have been described above. The above description is illustrative rather than exhaustive, and is not limited to the various implementations disclosed. Many modifications and variations will be apparent to persons of ordinary skill in the art without departing from the scope and spirit of the illustrated various implementations. The selection of terms as used herein is intended to best explain the principles and practical applications of the various implementations or improvements to technologies on the market, or to enable other persons of ordinary skill in the art to understand the various implementations disclosed herein.

The invention claimed is:

1. A method for storage management, comprising:
acquiring a reading request for a first target file, the reading request including a first target file name of the first target file;
determining a first target characteristic value for the first target file based on the first target file name, including applying a hash function to the first target file name, wherein the first target characteristic value is a hash value of the first target file name;
determining first target index information for the first target file from a mapping from characteristic values to index information based on the first target characteristic value, wherein the first target index information is used to index the first target file from a merged file which includes multiple sections for storing multiple files and is stored in a storage system, the multiple files including the first target file, and wherein the merged file is stored on a first storage device, and the first target index information is stored on a second storage device, the second storage device having a faster access speed than the first storage device; and
reading the first target file included in the merged file from the storage system based on the first target index information; acquiring a writing request for a second target file; and attaching, after the multiple sections of the merged file, a section for storing the second target file, wherein attaching a section for storing the second target file includes: determining whether the size of the second target file is lower than a threshold size; and attaching, after the multiple sections of the merged file, a section for storing the second target file if the size of the second target file is lower than the threshold size.

2. The method according to claim 1, wherein the mapping is cached in a memory, and wherein determining the first target index information includes:
determining the first target index information by accessing the mapping from the memory.

3. The method according to claim 2, further comprising:
reading from the storage system an index file corresponding to the merged file if it is determined that the mapping is removed from the memory, wherein the index file includes multiple entries respectively corresponding to the multiple files, each of the entries including at least a characteristic value for a corresponding file and index information for indexing the corresponding file from the merged file;
regenerating the mapping based on the characteristic values and index information included in the multiple entries in the index file; and
caching the regenerated mapping in the memory.

4. The method according to claim 3, wherein the index file is updated asynchronously with the merged file, and the multiple entries in the index file are in the same order as that of the multiple files in the merged file, and
wherein the method further includes:
determining, by comparing the merged file with the index file, that the merged file further includes at least one file added after the multiple files,
determining at least one characteristic value respectively corresponding to the at least one file and index information for respectively indexing the at least one file from the merged file, and
creating at least one new entry in the index file for storing the determined at least one characteristic value and index information.

5. The method according to claim 1, wherein the target index information includes an offset and a total size of a section, which is used to store the first target file, in the merged file.

6. The method according to claim 1, wherein the multiple sections also respectively store metadata associated with the multiple files.

7. The method according to claim 1, further comprising:
acquiring a deleting request for a third target file, the deleting request including a third target file name of the third target file;
determining a third target characteristic value for the third target file based on the third target file name;
setting, based on the third target characteristic value, a first flag bit in the mapping with regard to the third target file as deleted in order to block accesses to the third target characteristic value and third target index information that is mapped to the third target characteristic value; and
setting a second flag bit in the merged file with regard to the third target file as deleted in order to block accesses to the third target file.

8. The method according to claim 1, further comprising:
determining whether multiple flag bits respectively corresponding to at least one of the multiple files are set as deleted;
copying the at least one file to another merged file stored in the storage system if at least one flag bit respectively corresponding to the at least one file is not set as deleted;
deleting the merged file from the storage space; and
updating the mapping based on the another merged file.

9. The method according to claim 8, further comprising:
updating, based on the another merged file, an index file stored in the storage system and corresponding to the merged file, wherein the updated index file includes at least one entry respectively corresponding to the at least one file, each entry including at least a characteristic value of a corresponding file and index information for indexing the corresponding file from the merged file.

10. An electronic device, comprising:
at least one processor; and
at least one memory storing computer program instructions, the at least one memory and the computer program instructions being configured to cause, together with the at least one processor, the electronic device to perform actions comprising:
acquiring a reading request for a first target file, the reading request including a first target file name of the first target file;
determining a first target characteristic value for the first target file based on the first target file name, including applying a hash function to the first target file name, wherein the first target characteristic value is a hash value of the first target file name;
determining first target index information for the first target file from a mapping from characteristic values to index information based on the first target characteristic value, wherein the first target index information is used to index the first target file from a merged file which includes multiple sections for storing multiple files and is stored in a storage system, the multiple files including the first target file, and wherein the merged file is stored on a first storage device, and the first target index information is stored on a second storage device, the second storage device having a faster access speed than the first storage device; and
reading the first target file included in the merged file from the storage system based on the first target index information; wherein the actions further comprise:
acquiring a writing request fora second target file; and
attaching, after the multiple sections of the merged file, a section for storing the second target file, wherein attaching a section for storing the second target file includes: determining whether the size of the second target file is lower than a threshold size; and attaching, after the multiple sections of the merged file, a section for storing the second target file if the size of the second target file is lower than the threshold size.

11. The device according to claim 10, wherein the mapping is cached in a memory, and wherein determining the first target index information includes:
determining the first target index information by accessing the mapping from the memory.

12. The device according to claim 11, wherein the actions further comprise:
reading from the storage system an index file corresponding to the merged file if it is determined that the mapping is removed from the memory, wherein the index file includes multiple entries respectively corresponding to the multiple files, each of the entries including at least a characteristic value for a corresponding file and index information for indexing the corresponding file from the merged file;
regenerating the mapping based on the characteristic values and index information included in the multiple entries in the index file; and
caching the regenerated mapping in the memory.

13. The device according to claim 12, wherein the index file is updated asynchronously with the merged file, and the multiple entries in the index file are in the same order as that of the multiple files in the merged file, and wherein the actions further comprise:
determining, by comparing the merged file with the index file, that the merged file further includes at least one file added after the multiple files,
determining at least one characteristic value respectively corresponding to the at least one file and index information for respectively indexing the at least one file from the merged file, and
creating at least one new entry in the index file for storing the determined at least one characteristic value and index information.

14. The device according to claim 10, wherein the target index information includes an offset and a total size of a section, which is used to store the first target file, in the merged file.

15. The device according to claim 10, wherein the multiple sections also respectively store metadata associated with the multiple files.

16. A computer program product tangibly stored in a non-transitory computer-readable storage medium and including computer-executable instructions which, when executed, cause a device to perform operations comprising:
acquiring a reading request for a first target file, the reading request including a first target file name of the first target file;
determining a first target characteristic value for the first target file based on the first target file name, including applying a hash function to the first target file name, wherein the first target characteristic value is a hash value of the first target file name;
determining first target index information for the first target file from a mapping from characteristic values to index information based on the first target characteristic value, wherein the first target index information is used to index the first target file from a merged file which includes multiple sections for storing multiple files and is stored in a storage system, the multiple files including the first target file, and wherein the merged file is stored on a first storage device, and the first target index information is stored on a second storage device, the second storage device having a faster access speed than the first storage device; and
reading the first target file included in the merged file from the storage system based on the first target index information; wherein the operations further comprise: acquiring a writing request for a second target file; and attaching, after the multiple sections of the merged file, a section for storing the second target file, wherein attaching a section for storing the second target file includes: determining whether the size of the second target file is lower than a threshold size; and attaching, after the multiple sections of the merged file, a section for storing the second target file if the size of the second target file is lower than the threshold size.

* * * * *